Nov. 8, 1966  F. JOHSWICH  3,284,158
METHOD OF AND APPARATUS FOR REMOVING SULFUR
COMPOUNDS FROM GASES
Filed March 23, 1964
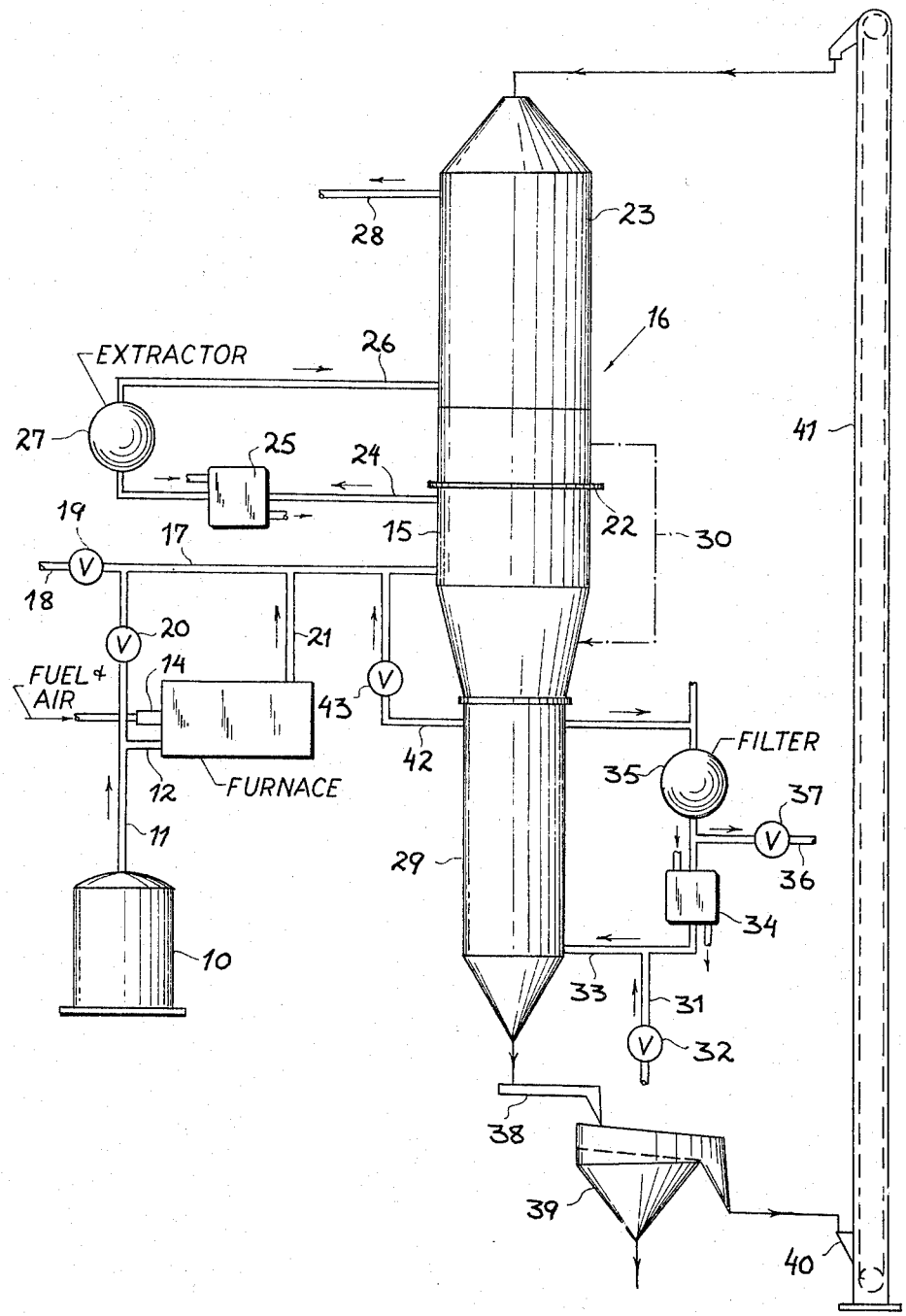
FRIEDRICH JOHSWICH
INVENTOR.

United States Patent Office 3,284,158
Patented Nov. 8, 1966

3,284,158
METHOD OF AND APPARATUS FOR REMOVING SULFUR COMPOUNDS FROM GASES
Friedrich Johswich, Essen, Germany, assignor to Reinluft G.m.b.H., Essen, Germany, a limited-liability company of Germany
Filed Mar. 23, 1964, Ser. No. 353,922
Claims priority, application Germany, June 20, 1963, R 35,460
9 Claims. (Cl. 23—178)

My present invention relates to the removal of compounds containing sulfur from industrial gases, especially the exhaust and waste gases of industrial processes, and, more particularly, to the removal of reducing-sulfur compounds alone or concurrently with the removal of oxidizing-sulfur compounds from gas streams.

For the purposes of the recent invention, the term "reducing-sulfur compound" is intended to denote all compounds containing sulfur in a relatively low oxidation state and in which the sulfur can be oxidized to a higher (more positive) oxidation state. Such compounds include dihydrogen sulfide ($H_2S$), carbon disulfide ($CS_2$) and carboxy sulfide (COS) as well as elemental sulfur ($S_2$ or $S_4$), all of which may be present in industrial gas streams. By an "oxidizing-sulfur compound" it is intended to designate those sulfur compounds in a relatively high oxidation state and to include sulfur dioxide ($SO_2$) and sulfur trioxide ($SO_3$), which may be present in this molecular configuration in an industrial gas stream or in the form of a hydration product, i.e. sulfurous acid ($H_2SO_3$) sulfuric acid ($H_2SO_4$), respectively. Other reducing-sulfur compounds wherein sulfur exists in a molecule with hydrogen and carbon, for example, and other oxidizing compounds wherein sulfur is chemically bound to oxygen and constitutes a relatively electropositive element with respect to the oxygen in the compound may also be used for the purpose of the instant invention.

It is a common expedient in the art of purifying industrial gases to remove the sulfur oxides normally present therein by adsorbing these oxides upon carbonaceous adsorbents at temperatures up to 250° C. in order to effect an oxidation of the lower oxides (e.g. $SO_2$) to the sulfur trioxide and a hydration of this higher oxide to sulfuric acid. The regeneration of the adsorbent was carried out via a further heating to a temperature of 300°–500° C. whereby the sulfuric acid formed as indicated previously reacts with the carbon of the adsorbent to produce $SO_2$ in accordance with the empirical relationship $$2H_2SO_4 + C = CO_2 + 2SO_2 + 2H_2O$$

On the other hand, reducing-sulfur compounds, of the type mentioned above, are also well known but require an adsorption of a cool gas (e.g. at a temperature below 50° C.) on activated carbonaceous adsorbent and the subsequent treatment of the adsorbent with a stream of hot gas or slightly superheated steam (at temperatures of or slightly above 100° C.) to drive the sulfur compounds out of the adsorbent. Under most conditions, a significant portion of the reducing-sulfur compound are converted, by more or less complete oxidation, to elemental sulfur or by further oxidation to sulfuric acid, both of which contaminate the adsorbent and must be removed frequently by extraction with carbon disulfide and/or water. These expedients are highly involved and costly and have prevented wide-spread use of adsorbents for the purposes indicated.

It is the principal object of the present invention, therefore, to provide a method of extracting sulfur compounds from industrial gases which is effective especially at relatively low concentrations of these gases (e.g. below 10% by volume) and in which the foregoing disadvantages can be obviated.

A further object of this invention is to provide a process and an apparatus for the simultaneous extraction of oxidizing and reducing sulfur compounds from industrial gases and mixtures thereof, while all recovered sulfur compounds will only appear in the form of $SO_2$.

Still another object of this invention is to provide a relatively inexpensive and simple method of removing sulfur compounds from a gas stream.

I have discovered that the foregoing objects can be obtained by a process for removing one or more reducing-sulfur compounds simultaneously with one or more oxidizing-sulfur compounds, in which the gas is contacted with a carbonaceous adsorbent at a temperature between about 50° and 250° C. when the molar ratio of the oxidizing-sulfur compounds is such that the molar proportion of sulfur in the sulfur oxides to the sulfur in the reducing compounds ranges between substantially 1.1:1 and 3.5:1, all of the sulfur of the adsorbent being chemically converted to sulfur dioxide by a heating of the adsorbent to a temperature between substantially 300° and 500° C. The invention is thus based upon my discovery that at temperatures slightly above that normally used for adsorption of reducing sulfur compounds, i.e., above 50° C., there exists a series of chemical reactions between the reducing-sulfur compounds, and, as oxidizing agents, the sulfur oxides and adsorbed sulfuric acid. Carboxy sulfide and carbon disulfide reacts in a manner similar to that in which the hydrogen sulfide reacts and can, for the purposes of the present invention, be considered as hydrogen sulfide of corresponding molar quantities with respect to the sulfur content of the reducing compounds. Thus the following reactions may be hypothesized for the conversion of carboxy sulfide and carbon disulfide into hydrogen sulfide during the adsorption process:

$$COS + H_2O = H_2S + CO_2$$
$$CS_2 + 2H_2O = 2H_2S + CO_2$$

Thus it is possible to treat these carbon-containing reducing sulfur compounds in terms of hydrogen sulfide.

Between the hydrogen sulfide and the sulfur oxides and, in certain cases, elemental oxygen, the following reactions can by hypothesized, these reactions being only a few of those possible although they apparently account for most of the formation of sulfur oxides and elemental sulfur observed in carrying out the present process:

$$3H_2SO_4 + H_2S = 4H_2O + 4SO_2$$
$$SO_3 + H_2O = H_2SO_4$$
$$2SO_2 + O_2 = 2SO_3$$
$$H_2SO_4 + H_2S = 2H_2O + SO_2 + S$$
$$6SO_3 + 2H_2S = 8SO_2 + 2H_2O$$
$$SO_3 + 3H_2S = 4S + 3H_2O$$
$$SO_2 + 2H_2S = 2H_2O + 3S$$
$$O_2 + 2H_2S = 2H_2O + 2S$$
$$3O_2 + 2H_2S = 2H_2O + 2SO_2$$
$$O_2 + S = SO_2$$

The adsorption stage thus involves the hydration of carbon disulfide and carboxy sulfide to hydrogen sulfide which, in combination with the hydrogen sulfide of the industrial gas, reacts with oxidizing agents such as oxygen, sulfur dioxide, sulfur trioxide and possibly sulfuric acid as indicated above to yield elemental sulfur or sulfur dioxide. During the second or desorption stage of the process, the carbonaceous adsorbent, which is passed countercurrent to the gas stream during the purifying process, is heated to a temperature between 300° and 500° C. in the course of which the sulfuric acid formed by hydration of sulfur trioxide, finally derived from oxidation of any of the sulfur compounds, reacts with the elemental sulfur in accordance with the equation $$2H_2SO_4 + S = 2H_2O + 3SO_2$$

this reaction taking place in preference to the reaction of sulfuric acid with the carbon of the adsorbent. An excess of the sulfuric acid does not constitute a difficulty in the present method since the excess acid, no longer having elemental sulfur with which to react, is reformed by reaction with the adsorbent to produce carbon dioxide and sulfur dioxide in accordance with the relationship $$2H_2SO_4 + C = CO_2 + SO_2 + 2H_2O$$

The following chain of reactions can thus be ascertained:

(1) The reducing-sulfur compounds are transformed into hydrogen disulfide by hydration although there is some possibility that carboxy sulfide and carbon disulfide react with oxygen, sulfur dioxide and/or sulfuric acid directly during the subsequent stage;

(2) The hydrogen sulfide (and any residual carboxy sulfide and carbon disulfide) reacts with sulfuric acid to give sulfur dioxide and/or elemental sulfur, with sulfuric dioxide to give elemental sulfur in accordance with the Claus-furnace reaction, with oxygen to give sulfuric dioxide and/or elemental sulfur, and with any sulfur trioxide which has not been hydrated to sulfuric acid to give sulfur dioxide and/or elemental sulfur;

(3) Elemental sulfur produced during the adsorption stage is reacted with residual oxygen in the gas stream to produce sulfur dioxide; and (4) The temperature of the adsorbent is then raised to its desorbing temperature (300°–500° C.) in the course of which all sulfuric acid remaining in the adsorbent and produced therein by oxidation of sulfur and/or sulfur dioxide reacts with the elemental sulfur produced during step (2) but remaining after step (3) to yield sulfur dioxide. During this step, any excess sulfuric acid is removed by reaction with carbon to yield sulfur dioxide.

Thus it will be clear that only sulfur dioxide, as a sulfur compound, results from the present process. The invention resides essentially in the discovery that, by maintaining a molar ratio from 1.1:1 to 3.5:1 between the oxidizing sulfur compounds and the reducing sulfur compounds (the molar ratio being in terms of sulfur content) it is possible to carry out the reaction series to completion and produce sulfur dioxide without contamination of the adsorbent by residual elemental sulfur after the desorption step. This will be apparent from the following empirical treatment:

Let it be assumed that one mol each of carboxy sulfide, carbon disulfide and dihydrogen sulfide are present in an industrial gas stream containing 14 moles of oxidizing sulfur compounds including 12 moles of sulfur dioxide and 2 moles of sulfur trioxide. In this idealized case, during step 1 of the adsorption process at a temperature of, say, 65° C. with activated charcoal the carboxy sulfide will be converted to one mole of hydrogen sulfide while the carbon disulfide is transformed into two moles of hydrogen sulfide, upon hydration, so that four moles of hydrogen sulfide are now present. If subsequently all four moles of hydrogen sulfide are assumed to react with two moles of sulfur dioxide, six moles of elemental sulfur and four moles of water are produced during this first step. An oxidation of the remaining 10 moles of $SO_2$ to $SO_3$ and hydration of all of the sulfur trioxide results during the second step and, in the course of regeneration at a temperature of 400° C., the twelve moles of sulfuric acid can react with the six moles of sulfur to produce eighteen moles of sulfur dioxide. Thus there is total conversion of all of the sulfur compounds to sulfur dioxide and the sulfur molar ratio of oxidizing compounds of sulfur to reducing-sulfur compounds is 3.5:1. In practice, all of the hydrogen sulfide will not be converted only to elemental sulfur but will partly become oxidized even to a sulfur oxide. It must be emphasized, therefore, that the maintenance of the aforementioned molar range is critical to the proper functioning of the present invention.

According to another feature of this invention, the gas to be treated is first subjected to a preliminary step in which its oxidizing sulfur compounds and its reducing-sulfur compounds are brought into the molar-ratio range mentioned above. Thus the preliminary step of the invention may include a precombustion of the gas or a portion thereof to convert some of its reducing sulfur compounds to higher oxides of sulfur or to convert entrained aerosol particles and vapor of elemental sulfur into sulfur oxides. Upon recombination of the portion of the gas stream passed through the precombustion means or furnace with the remainder of the gas stream, the latter possesses a ratio of oxidizing compounds to reducing compounds within the indicated range.

Another method of maintaining the indicated ratio, according to the present invention, is to regeneratively recycle sulfur dioxide desorbed from the corbonaceous mass and to admix it with the gas steam and thus increase the proportion of sulfur oxides in the latter. In this case, however, the equipment must be designed for a larger throughput capacity since the recycling of a given quantity of $SO_2$ necessitates the continual adsorption and desorption of this quantity in addition to the quantity of sulfur compounds present in the initial gas to be treated.

Still another method of compensating for the excess of reducing-sulfur compounds over oxidizing-sulfur compounds above the ratio of 1.1:1 and 3.5:1, based upon the sulfur content, is to admit oxygen into the desorbing means during the regeneration step at a point at which, on account of a sufficiently high temperature, only sulfur can react with the oxygen and no carbonaceous material is available to react in this manner. The oxygen will thus convert the excess sulfur to sulfur dioxide.

Still another technique involves a two-stage adsorption wherein the gas stream is passed into contact with a carbonaceous adsorbent initially at a temperature between 130° and 250° C. so that most of the oxidizing-sulful compounds will react with the reducing-sulfur compounds to produce elemental sulfur. In this temperature range, however, elemental sulfur possesses a relatively high vapor pressure and is highly volatile so that a relatively large part of the sulfur will be carried along by the moving gas stream and only an insignificantly small portion will deposit on the adsorbent. The effluent gas is not, however, passed directly into the second adsorption stage, which is maintained at a temperature between 50° and 130° C. as indicated previously, but is fed into a cooling means or condenser wherein the temperature is below 130° C. and the major part of the elemental sulfur is removed from the system. Thereupon, the gas is passed into the second stage, maintained at a temperature between 50° and 130° C. and preferably at or somewhat above 100° C. wherein the sulfur dioxide is converted to sulfur trioxide and adsorbed. During the regeneration step, at a temperature between 300° and 500° C., any sulfuric acid or sulfur trioxide formed during the or carried into the two adsorption stages reacts with any excess sulfur deriving from hydrogen sulfide to produce sulfur dioxide and, since the amount of sulfur in the adsorbent during the regeneration stage is small, with carbon to produce carbon dioxide and sulfur dioxide.

The above and other objects, features and advantages of the present invention will become more readily apparent from the following description, reference being made to the accompanying drawing, the sole figure of which is a flow diagram of an apparatus for carrying out the method of the present invention.

In the drawing I show a source 10 of industrial waste gas, such as a metallurgical furnace, a chemical plant, a fiber-spinning installation or the like whose exhaust conduit 11 has a branch 12 by which a portion of this exhaust stream, which can be rich in reducing-sulfur compounds, is supplied to a precombustion furnace 13 into which a fuel and air mixture is admitted via a burner 14. The main portion of the exhaust gas can be fed directly into the lower portion 15 of an adsorption tower 16 via a conduit 17 wherein the gas stream from the installation 10 is admixed with, for example, a gas stream rich in oxidizing-sulfur compounds from another plant via conduit 18. Valves 19 and 20 can adjust a relative concentration of the oxidizing and reducing-sulfur compounds respectively. The outflow from furnace 13 also is supplied to conduit 17 by a pipe 21. A shutter 22 subdivides the tower 16 into the lower portion 15 in which the oxidizing and reducing sulfur compounds react to form elemental sulfur and sulfur dioxide, in accordance with one aspect of the invention, and an upper adsorption chamber 23 in which sulfur dioxide is removed from the gas stream and oxidized to sulfur trioxide-sulfuric acid. When the two-step adsorption process is not employed, shutter 22 is removed and the entire tower is employed for adsorption in a single stage.

An effluent rich in sulfur dioxide and elemental sulfur at an elevated temperature is removed from the lower compartment 15, when shutter 22 is in place, and fed by a pipe 24 into a condenser or cooler 25, which can be a conventional heat exchanger, prior to being passed by a conduit 26 through an extractor 27 into the upper compartment of the tower. Extractor 27 removes precipitated elemental sulfur which is recovered as a byproduct. In chamber 23 of the tower 16, the gas stream flows countercurrent (i.e. upwardly) to a continuously moving descending mass of the carbonaceous adsorbent prior to emerging from the tower at 28 free from sulfur compounds. When shutter 22 is in place, the adsorbent is passed into the desorber 29 of the tower as indicated by the dot-dash adsorbent path 30. When, however, no shutter is used, the adsorbent passes continuously through the tower 16 into the desorbing chamber.

In the desorbing chamber 29, oxygen or an oxygen-containing gas can be fed through conduit 31 at a rate controlled by valve 32 into the desorber for oxidizing any excess elemental sulfur. As indicated, this oxygen stream joins a continuously recycled regenerating gas stream, supplied through the desorber by conduit 33 and adapted to drive sulfur dioxide from the adsorbent in chamber 29. The cycled gas is heated at 34 prior to being fed into the desorber, the regenerating gas containing sulfur dioxide being bled off by a conduit 36 via valve 37.

The carbonaceous adsorbent, free from sulfur compounds, is then removed from the desorbing chamber by a conveyor device 38 (e.g. an Archimedean screw), passed into a dust-removing filter 39 and supplied to the hopper 40 of a conveyor 41 which continuously recycles the adsorbent to the adsorption tower 16. Filter 39 removes adsorbent particles of improper size. A pipe 42 and a valve 43 supply a predetermined amount of sulfur dioxide to the incoming gas stream at conduit 17 in the event the reducing-sulfur compounds of the gas stream are in excess of the indicated molar ratio.

*Example I*

The combined exhaust gases of a sulfuric acid plant and a synthetic-silk spinning plant producing rayon fibers is purified in such manner that 90% of the sulfur compounds are removed from the combined exhaust gas and the remaining sulfur compound is sulfur dioxide. The combined gas contains, per cubic meter of the exhaust at standard temperature and pressure (i.e. 0° C. and atmospheric pressure), 5.0 grams $SO_2$, 0.5 gram $SO_3$, 0.6 gram $H_2S$ and 0.5 gram $CS_2$. This gas is passed through carbonaceous adsorbent (i.e. activated charcoal) at a temperature of 60° C. with a contact time of 5 to 20 seconds. The effluent gas is found to contain 0.74 g./m.$^3$ (STP) in contrast to a total sulfur content of 7.4 g./m.$^3$ (STP) calculated in terms of sulfur dioxide. Since the molar ratio of sulfur in the oxidizing-sulfur compounds to that in the reducing-sulfur compounds is 2.74:1, no preliminary treatment of feedback or sulfur dioxide is thus necessary.

*Example II*

The exhaust gas from a Claus furnace has a temperature of 135° C. and contains 5.6 g. $SO_2/m.^3$ (STP), 5.8 g. $H_2S/m.^3$ (STP) and 0.8 g. $S_2/m.^3$ (STP). Since the molar ratio of sulfur in the oxidizing-sulfur compounds to sulfur in the reducing-sulfur compounds is, in this case, 0.45:1, a purification to the desired extent is not possible without pretreatment. Consequently half of the exhaust gas is fed (e.g. via conduit 12) to a precombustion chamber 13 where it is burned in the presence of fuel oil and air and is then mixed with a noncombusted half of the gas stream. The mixture is found to contain 10.2 g. $SO_2/m.^3$ (STP), 1.0 g. $SO_3/m.^3$ (STP), 2.7 g. $H_2S/m.^3$ (STP) and 0.4 g. $S_2/m.^3$ (STP). In this case the molar ratio of sulfur in the oxidizing compounds to that of the reducing compounds is 1.87:1 and within the critical range. When this gas is passed with the contact time of 10–30 seconds countercurrent to a stream of grained activated charcoal at a temperature of 135° C., a reduction in the sulfur content of the gas, based upon the Claus-furnace exhaust, of over 90% is achieved.

*Example III*

An exhaust gas from a rayon-fiber spinning plant, containing 1.5 g. $H_2S/m.^3$ (STP) and 1.1 g. $CS_2/m.^3$ (STP) is treated at a rate of 30,000 m.$^3$/hour (STP), the treatment being carried out at a temperature of 65° C. with a contact time of 5 to 20 seconds. Since the exhaust gas contains no oxidizing sulfur compounds, one method of providing these compounds is to burn the entire gas stream with fuel oil and air to convert a portion of the reducing-sulfur compounds into oxidizing sulfur compounds. This procedure requires a fuel oil consumption of 350 kg./hour. In accordance with the present technique, however, the gas stream is subjected only to a partial combustion with an oil burner and is brought from its temperature of 25° C. to a temperature of 65° C. with the consumption of fuel oil of only 50 kg./hour. A portion of the exhaust gas, which passes over the rayon-spinning bath containing about 20% by volume of oxygen, is fed to the oil burner instead of other combustion air so that already part of the reducing-sulfur compounds is converted to sulfur dioxide and sulfur trioxide. The gas leaving the combustion chamber still contains a high concentration of $H_2S$ and $CS_2$, relative to the concentration of the sulfur oxides, so that adsorption still results in the formation of considerable quantities of elemental sulfur as well as some unreacted $H_2S$ and $CS_2$ along with a minor proportion of sulfuric acid. In the desorber, the amount of sulfur dioxide extracted from the adsorber is greater than that of the exhaust gas stream so that some of this sulfur dioxide is returned to the inlet of the tower and admixed with the gas stream until, after a few hours of treatment, the gas stream fed into the tower contains 7.0 g. $SO_2/m.^3$ (STP) in addition to 1.5 g. $H_2S$ and 1.1 g. $CS_2/m.^3$ (STP), the oxidizing sulfur compounds formed in the oil burner being ignored. Under these conditions, the molar ratio of sulfur in the oxidizing sulfur compounds to that of the reducing-sulfur compounds becomes 1.5:1 and falls into the critical range.

Since continued treatment of the gas results in the conversion of all of the reducing sulfur compounds to sulfur dioxide, the reducing compounds yield 4.67 g. of $SO_2/m.^3$ (STP) so that 351 kg. of $SO_2$/hour, i.e. (4.7 +7.0)×30, is formed in the desorber. Of this amount, 7.0×30 or 210 kg. of $SO_2$/hour is continuously recycled for admixture with the gas stream so that a net yield of 141 kg. of $SO_2$/hour is achieved. A purification system operating in this manner should, therefore, be designed for a throughput of 351 kg./hour of $SO_2$ and not only for the net yield.

Example IV

A flue gas containing a mixture of sulfur oxides and reducing-sulfur compounds at a temperature of 90° C. is treated at a rate of 50,000 m.³/hour (STP) with an activated carbon adsorbent for a contact period of 8 to 25 seconds. During adsorption, 460 kg./hour of sulfuric acid and 100 kg./hour of elemental sulfur are deposited upon the adsorbent. The indicated quantity of sulfuric acid is, however, capable of transforming only 75 kg. of elemental sulfur to sulfur dioxide.

$$\left(\frac{460\times32}{2\times98}=75\right)$$

The remaining 25 kg./hour of sulfur are burned in the presence of oxygen which is introduced into the desorber 29 by conduit 31. The desorber should thus be designed so that the oxygen does not come into contact with the carbon at a temperature sufficient to burn the adsorbent although the temperature must be at least 250° C. (i.e. the ignition temperature of sulfur). 83.5 m.³/hour (STP) of air is required since $$\frac{25\times22.4}{32\times0.21}=83.5$$

where 22.4 represents the number of liters occupied by one mole of gas at standard temperature and pressure, and "0.21" the ratio of oxygen to air on a volume basis. In practice it is advisable to employ a slightly lighter amount of air to make sure that all sulfur will be oxidized.

Example V

The same gas as in Example IV, flowing at the rate of 50,000 m.³/hour (STP), is introduced into the first stage 15 of the adsorber at 145° C., at which temperature the vapor pressure of sulfur is 0.16 mm. mercury. The gas stream thus carries along $(0.16\times50,000\times2.86)/760=30$ kg./hour sulfur vapor (in this calculation 2.86 represents the weight of 1 m.³ of sulfur vapor (STP), so that the amount of sulfur deposited on the adsorbent is only 70 kg./hour. This amount may be oxidized in the desorber by the amount of sulfuric acid present, namely 460 kg./hour.

Prior to entering the second adsorption stage the gas is cooled in condenser 25 to 110° C., at which temperature the vapor pressure of sulfur is 0.025 mm. mercury. Hence the amount of residual sulfur vapor contained in the gas issuing from the condenser is $(0.025\times50,000\times2.86)/760=4.7$ kg./hour, and this amount entering the second stage is readily oxidized to $SO_2$ and then to $H_2SO_4$. Thus the purification of the gas can be carried out without any further measures, provided that care is taken that the condensed sulfur is continuously removed from the condenser conduit via filler 27.

The invention described and illustrated is believed to admit of many modifications within the ability of persons skilled in the art, all such modifications being considered within the spirit and scope of the appended claims.

What is claimed is:

1. A method of removing sulfur compounds from a gas stream containing up to about 10% by volume of gaseous oxidizing-sulfur compounds and reducing-sulfur compounds, comprising the steps of:
    (a) modifying the concentration of said oxidizing-sulfur compounds and said reducing-sulfur compounds so that said oxidizing-sulfur compounds and said reducing-sulfur compounds are present in a molar-ratio range between 1.1:1 and 3.5:1, based upon the sulfur present in said compounds;
    (b) passing the gas stream into contact with a solid carbonaceous adsorbent in the presence of an oxidizing agent at a temperature in excess of 50° C. and sufficient to oxidize substantially all of said reducing sulfur compounds and thereby convert them into at least one substance selected from the group which consists of elemental sulfur, sulfur dioxide and sulfur trioxide, adsorbing said oxidizing-sulfur compounds on said adsorbent, and depositing sulfuric acid thereon;
    (c) heating said adsorbent to a temperature between substantially 300° and 500° C. for a period sufficient to convert substantially all of said elemental sulfur, said sulfuric acid and said oxidizing-sulfur compounds to sulfur dioxide; and
    (d) removing sulfur dioxide from said adsorbent.

2. A method of removing sulfur compounds from a gas stream containing up to about 10% by volume of gaseous oxidizing-sulfur compounds and reducing-sulfur compounds, comprising the steps of:
    (a) modifying the concentration of said oxidizing-sulfur compounds and said reducing sulfur compounds so that said oxidizing sulfur compounds and said reducing-sulfur compounds are present in a molar-ratio range between 1.1:1 and 3.5:1, based upon the sulfur present in said compounds;
    (b) continuously passing the gas stream countercurrent with a continuously moving mass of a solid carbonaceous adsorbent in contact therewith in the presence of an oxidizing agent at a temperature in excess of 50° C. and sufficient to oxidize substantially all of said reducing-sulfur compounds and thereby convert them into at least one substance selected from the group which consists of elemental sulfur, sulfur dioxide and sulfur trioxide, adsorbing said oxidizing-sulfur compounds on said adsorbent and depositing sulfuric acid thereon;
    (c) continuously heating said adsorbent to a temperature between substantially 300° and 500° C. for a period sufficient to convert at least part of said elemental sulfur, said sulfuric acid and said oxidizing-sulfur compounds to sulfur dioxide;
    (d) removing sulfur dioxide from said adsorbent; and
    (e) recycling adsorbent from which sulfur dioxide has been removed into contact with said gas stream.

3. A method of removing sulfur compounds from a gas stream containing up to about 10% by volume of gaseous oxidizing-sulfur compounds and reducing-sulfur compounds, comprising the steps of:
    (a) modifying the concentration of said oxidizing-sulfur compounds and said reducing-sulfur compounds to that said oxidizing-sulfur compounds and said reducing-sulfur compounds are present in a molar-ratio range between 1.1:1 and 3.5:1, based upon the sulfur present in said compounds;
    (b) passing the gas stream into contact with a solid carbonaceous adsorbent in the presence of an oxidizing agent at a temperature in excess of 50° C. and sufficient to oxidize substantially all of said reducing-sulfur compounds and thereby convert them into at least one substance selected from the group which consists of elemental sulfur, sulfur dioxide and sulfur trioxide adsorbing said oxidizing-sulfur compounds on said adsorbent, and depositing sulfuric acid thereon;
    (c) heating said adsorbent to a temperature between substantially 300° and 500° C. for a period sufficient to convert substantially all of said elemental sulfur, said sulfuric acid and said oxidizing-sulfur compounds to sulfur dioxide;
    (d) introducing oxygen at a temperature between 250° and 500° C. to convert any elemental sulfur remaining after step (c) to sulfur dioxide; and
    (e) removing sulfur dioxide from said adsorbent.

4. A method of removing sulfur compounds from a gas stream containing up to about 10% by volume of gaseous oxidizing-sulfur compounds and reducing-sulfur compounds, comprising the steps of:
    (a) modifying the concentration of said oxidizing-sulfur compounds and said reducing-sulfur compounds so that said oxidizing-sulfur compounds and said reducing-sulfur compounds are present in a molar-ratio range between 1.1:1 and 3.5:1, based upon the sulfur present in said compounds;
(b) continuously passing the gas stream countercurrent with a continuously moving mass of a solid carbonaceous adsorbent in contact therewith in the presence of an oxidizing agent at a temperature in excess of 50° C. and sufficient to oxidize substantially all of said reducing-sulfur compounds and thereby convert them into at least one substance selected from the group which consists of elemental sulfur, sulfur dioxide and sulfur trioxide, adsorbing said oxidizing-sulfur compounds on said adsorbent, and depositing sulfuric acid thereon;
(c) heating said adsorbent to a temperature between substantially 300° and 500° C. for a period sufficient to convert at least part of said elemental sulfur, said sulfuric acid and said oxidizing-sulfur compounds to sulfur dioxide;
(d) introducing oxygen at a temperature between 250° and 500° C. to convert any elemental sulfur remaining after step (c) to sulfur dioxide;
(e) removing sulfur dioxide from said adsorbent; and
(f) recycling adsorbent from which sulfur dioxide has been removed into contact with said gas stream.

5. A method as defined in claim 4 wherein the concentrations of said oxidizing-sulfur compounds and said reducing-sulfur compounds are continuously maintained at a level corresponding to said molar-ratio range by combusting a portion of the reducing-sulfur compounds in said gas stream to convert said portion into oxides of sulfur.

6. A method as defined in claim 4, further comprising the steps of recycling a portion of the sulfur dioxide removed from said adsorbent in step (e) and admixing said portion with said gas stream prior to passing it into contact with said adsorbent.

7. A method as defined in claim 4, further comprising the steps of:
(g) removing elemental sulfur from said gas stream by cooling said gas stream between two steps of passing it into contact with said adsorbent, thereby condensing elemental sulfur from said stream.

8. A method as defined in claim 7, further comprising the step of:
(h) contacting said gas stream with a carbonaceous adsorbent at a temperature between substantially 130° and 250° C. prior to the cooling of said gas stream in step (g).

9. A method as defined in claim 8 wherein step (b) is carried out at a temperature between substantially 50° and 130° C.

References Cited by the Examiner
UNITED STATES PATENTS

| | | | |
|---|---|---|---|
| 1,422,008 | 7/1922 | Soddy | 55—208 |
| 2,233,841 | 3/1941 | Lepsoe | 23—178 |
| 2,519,296 | 8/1950 | Simpson | 55—208 |
| 3,047,364 | 7/1962 | Vian-Ortuno | 23—178 |

OSCAR R. VERTIZ, *Primary Examiner.*

BENJAMIN HENKIN, *Examiner.*

R. M. DAVIDSON, A. J. GREIF, *Examiners.*